United States Patent
Guo et al.

(10) Patent No.: US 9,603,135 B2
(45) Date of Patent: Mar. 21, 2017

(54) METHOD AND SYSTEM FOR TRANSMITTING POSITION REFERENCE SIGNAL SUBFRAME

(75) Inventors: Senbao Guo, Shenzhen (CN); Yunfeng Sun, Shenzhen (CN); Bo Dai, Shenzhen (CN); Zhisong Zuo, Shenzhen (CN); Junfeng Zhang, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 537 days.

(21) Appl. No.: 13/978,688

(22) PCT Filed: Nov. 29, 2011

(86) PCT No.: PCT/CN2011/083168
§ 371 (c)(1),
(2), (4) Date: Jul. 8, 2013

(87) PCT Pub. No.: WO2012/092800
PCT Pub. Date: Jul. 12, 2012

(65) Prior Publication Data
US 2013/0294391 A1    Nov. 7, 2013

(30) Foreign Application Priority Data

Jan. 7, 2011   (CN) .......................... 2011 1 0002691

(51) Int. Cl.
*H04W 72/04* (2009.01)
*H04L 5/00* (2006.01)
*H04L 27/26* (2006.01)

(52) U.S. Cl.
CPC ......... *H04W 72/042* (2013.01); *H04L 5/0048* (2013.01); *H04L 27/2666* (2013.01); *H04L 5/0091* (2013.01); *H04L 27/2607* (2013.01)

(58) Field of Classification Search
CPC ... H04W 72/042; H04W 64/00; H04W 72/00; H04W 4/02; H04W 72/04;
(Continued)

(56) References Cited

U.S. PATENT DOCUMENTS

2010/0195566 A1* 8/2010 Krishnamurthy et al. ... 370/328
2010/0239034 A1* 9/2010 Lee et al. ...................... 375/260
(Continued)

FOREIGN PATENT DOCUMENTS

CN   101594336 A   12/2009
CN   101742698 A   6/2010
(Continued)

OTHER PUBLICATIONS

Huawei, "Discussion on subframe collision in the presence of time accumulation", Jun. 29-Jul. 3, 2009, 3GPP, 3GPP TSG RAN WG1 #57bis, Los Angeles, USA, R1-092353.*
(Continued)

*Primary Examiner* — Pao Sinkantarakorn
*Assistant Examiner* — Michael Phillips
(74) *Attorney, Agent, or Firm* — Koppel, Patrick, Heybl & Philpott

(57) ABSTRACT

The disclosure claims a method and a device for transmitting a Position Reference Signal (PRS) subframe. In the disclosure, the network side configures certain channels or signals according to the configuration condition of the PRS, or the network side configures the PRS according to the configuration condition of certain channels or signals; the receiving side correctly identifies the length of Cyclic Prefix (CP) according to the configuration information issued by the network side, so as to correctly measure and accurately receive the channels or signals sent by the network side. The disclosure overcomes the technical problem in the conventional art that the length of CP is ambiguous, so that the
(Continued)

---

101   The network side configures at least one of CSI-RS, PDSCH and Relay backhaul link according to the configuration condition of the PRS; or configures the PRS according to the configuration condition of at least one of CSI-RS, PDSCH and Relay backhaul link

↓

102   The network side notifies the configuration information of PRS and the configuration information of at least one of the corresponding CSI-RS, PDSCH and Relay backhaul link to the receiving side

↓

103   The receiving side identifies the length of CP according to the configuration information of PRS and the configuration information of at least one of the corresponding CSI-RS, PDSCH and Relay backhaul link, so as to correctly measure and accurately receive the signals signals cannot be measured and accurately received by the receiving side.

19 Claims, 1 Drawing Sheet

(58) Field of Classification Search
CPC .............. H04L 5/0048; H04L 27/2607; H04L 27/2666; H04L 5/0091; H04L 5/003; H04L 5/0023; H04L 27/261; H04L 5/0094; G01S 5/10
See application file for complete search history.

(56) References Cited

U.S. PATENT DOCUMENTS

| | | | |
|---|---|---|---|
| 2010/0254471 A1* | 10/2010 | Ko et al. ...................... | 375/260 |
| 2010/0273506 A1* | 10/2010 | Stern-Berkowitz et al. ...................... | 455/456.1 |
| 2011/0117925 A1* | 5/2011 | Sampath et al. ............ | 455/456.1 |
| 2011/0124347 A1* | 5/2011 | Chen et al. ................. | 455/456.1 |
| 2011/0158200 A1* | 6/2011 | Bachu et al. ................. | 370/330 |
| 2011/0222485 A1* | 9/2011 | Nangia et al. ................. | 370/329 |
| 2011/0319109 A1* | 12/2011 | Kang et al. ..................... | 455/507 |
| 2012/0027110 A1* | 2/2012 | Han ...................... H04J 11/0079 375/260 |
| 2012/0051445 A1* | 3/2012 | Frank et al. ................. | 375/259 |
| 2012/0083278 A1* | 4/2012 | Kazmi ................. H04W 64/00 455/440 |
| 2012/0093101 A1* | 4/2012 | Dai et al. ...................... | 370/329 |
| 2012/0093122 A1* | 4/2012 | Dai et al. ...................... | 370/330 |
| 2012/0106374 A1* | 5/2012 | Gaal et al. ..................... | 370/252 |
| 2012/0122472 A1* | 5/2012 | Krishnamurthy et al. | 455/456.1 |
| 2012/0165053 A1* | 6/2012 | Yoon et al. ................... | 455/501 |
| 2012/0190393 A1* | 7/2012 | Ishii ...................... G01S 5/0036 455/509 |
| 2012/0307670 A1* | 12/2012 | Kazmi et al. ................. | 370/252 |
| 2013/0022096 A1* | 1/2013 | Kazmi ................ H04L 27/2602 375/224 |
| 2013/0122930 A1* | 5/2013 | Woo et al. ................. | 455/456.1 |
| 2013/0279362 A1* | 10/2013 | Park et al. ..................... | 370/252 |
| 2013/0294271 A1* | 11/2013 | Nagata ................. H04W 24/10 370/252 |
| 2013/0315197 A1* | 11/2013 | Park et al. ..................... | 370/329 |

FOREIGN PATENT DOCUMENTS

| | | | | |
|---|---|---|---|---|
| KR | WO 2010117236 A2 * | 10/2010 | ......... | H04J 11/0079 |
| WO | 2010/095887 | * | 8/2010 | |
| WO | WO2010145180 A1 | 12/2010 | | |

OTHER PUBLICATIONS

Seo et al., "Method for Alloocating Reference Signals of a Backhaul Link in a Relay Communication System, and Method and Apparatus for Transmitting/Receiving Data Using Same", Aug. 26, 2010, WO, WO 2010/095887, machine translation.*
Huawei, Indication and Acquisition Method, Device and System of CP length configuration, Jun. 16, 2010, CN, CN101742698, machine translation.*
ZTE Corporation, "Method for Sending Positioning Reference Signals"; Dec. 2, 2009, CN, CN101594336, machine translation.*
Han et al., "Method and Apparatus for Transmitting Positioning Reference Signal in Wireless Communication System", Oct. 14, 2010, WO, WO 2010/117236, machine translation.*
International Search Report (Form PCT/ISA/210) for PCT/CN2011/083168, mailed Mar. 1, 2012.

* cited by examiner

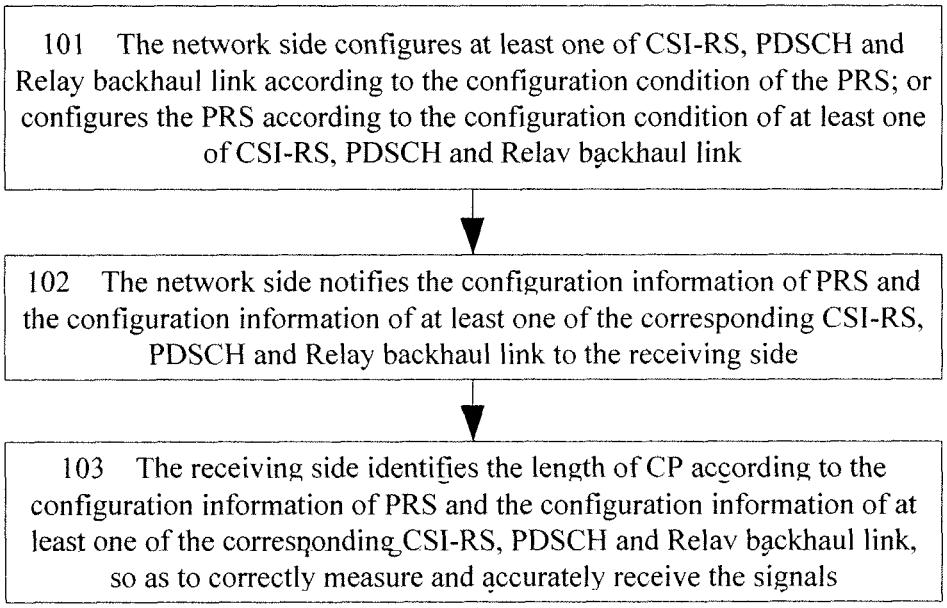

METHOD AND SYSTEM FOR TRANSMITTING POSITION REFERENCE SIGNAL SUBFRAME

FIELD OF THE INVENTION

The disclosure relates to the Long Term Evolution Advanced (LTE-Advanced) system, and in particular to a method and a system for transmitting a Position Reference Signal (PRS) subframe in the LTE-Advanced system.

BACKGROUND OF THE INVENTION

The Long Term Evolution (LTE) technology introduces the Orthogonal Frequency Division Multiplexing (OFDM) technology, of which one advantage is that the Inter-Symbol Interference (ISI) and Inter-Carrier Interference (ICI) can be reduced via Cyclic Prefix (CP). In LTE R9, the PRS is introduced in order to measure the location of the receiving side, so that the receiving side can accurately measure the location of the receiving side by using the PRS. The PRS can be configured and transmitted in the Normal subframe and the Multiple Broadcast Single Frequency Network (MBSFN) subframe in the LTE radio frame. In one radio frame, if the PRS is configured in the Normal subframe and in the MBSFN subframe, the OFDM symbol CP length of the subframe where the PRS locates needs to be configured as the CP length of the subframe 0; if the PRS is only configured in the MBSFN subframe, the OFDM symbol CP of the subframe where the PRS locates needs to be configured as Extended CP.

In LTE Release 9 stage, an MBSFN domain and a Non-MSBFN domain can be configured in the MSBFN subframe, wherein the Non-MSBFN domain only can include former one OFDM symbol or two OFDM symbols in one subframe. The Physical Downlink Control Channel (PDCCH) of Release 8 and Release 9 can be transmitted in the Non-MSBFN domain of the MBSFN subframe, however, the MBSFN domain is not allowed to be configured as the Physical Downlink Shared Channel (PDSCH) of Release 8 and Release 9 for transmission. In the LTE-Advanced R10 stage, both of the Non-MBSFN domain and the MBSFN domain in the MBSFN subframe can be configured to transmit the PDCCH and PDSCH of Release 10. In addition, whether the PDSCH of Release 10 in the MBSFN subframe adopts the Normal CP or the Extended CP is not scheduled by an individual rule in the standard; it is described in the Release 10 36.814 that the PDSCH of Release 10 in the MBSFN subframe adopts the CP length of the subframe 0. So the solution finally adopted in the standard is that the CP of PDSCH in the MBSFN subframe is transmitted according to the CP length detected by the receiving side, namely, the receiving side uniformly transmits the PDSCH according to the CP length of the subframe 0, without identifying whether it is the Normal subframe or the MBSFN subframe.

The problem caused here is that if the PRS is only transmitted in the MBSFN subframe, and if the PDSCH of Release 10 is transmitted in the MBSFN subframe, the Extended CP needs to be transmitted in the MBSFN subframe at this time according to the requirements of the PRS, whereas the CP of the subframe 0 needs to be transmitted in the MBSFN subframe according to the requirements of the PDSCH of Release 10; if the CP of the subframe 0 is configured to be the Normal CP at this time, different CP lengths in this subframe may conflict with each other. The receiving side does not know the CP type adopted by the network side in this subframe, thus causing incorrect detection.

The Channel State Information Reference Signal (CSI-RS) and the Relay backhaul link have the same problem with the PDSCH, namely, referring to the CP length ambiguity, so that the signals cannot be measured and accurately received.

SUMMARY OF THE INVENTION

For this reason, the disclosure is to provide a method and a device for transmitting a PRS, for solving the technical problem that when the PDSCH, the CSI-RS and the Relay backhaul link in Release 10 are be transmitted with the PRS, the CP length is ambiguous such that the receiving side is unable to measure and accurately receive signals.

In order to achieve the purpose, the technical solution of the disclosure is realized as follows:

a method for transmitting a PRS, including:

a network side configuring at least one of a CSI-RS, a transmission PDSCH and a Relay backhaul link according to the configuration condition of a PRS, or the network side configuring the PRS according to the configuration condition of at least one of the CSI-RS, the transmission PDSCH and the Relay backhaul link; and a receiving side identifying the length of CP, measuring and receiving signals transmitted by the network side according to the configuration information of the PRS which is issued by the network side and the configuration information of at least one of the corresponding CSI-RS, the transmission PDSCH and the Relay backhaul link.

Preferably, a subframe configured to transmit the PRS by the network side is not configured to transmit the CSI-RS; or a subframe configured to transmit the CSI-RS by the network side is not configured to transmit the PRS.

The receiving side does not receive the CSI-RS on the subframe which transmits the PRS when receiving the channels or signals of the network side; or, the receiving side does not receive the PRS on the subframe which transmits the CSI-RS.

Preferably, a subframe configured to transmit the PRS only in an MBSFN subframe by the network side is not configured to transmit the CSI-RS; or a subframe for transmitting the CSI-RS configured by the network side is not configured to transmit the PRS which is transmitted only in the MBSFN subframe.

The receiving side does not receive the CSI-RS on the subframe which transmits the PRS only configured in the MBSFN subframe when receiving the channels or signals of the network side; or, the receiving side does not receive the PRS which is only configured on the MBSFN subframe on the subframe which transmits the CSI-RS.

Preferably, when the network side configures the subframe 0 as a Normal CP, the subframe for transmitting the PRS configured by the network side is not configured to transmit the CSI-RS; or, when the network side configures the subframe 0 as the Normal CP, the subframe for transmitting the CSI-RS configured by the network side is not configured to transmit the PRS.

When the CP of the received subframe 0 is the Normal CP, the receiving side does not receive the CSI-RS on the subframe which transmits the PRS when receiving the channels or signals of the network side; or, when the CP of the received subframe 0 is the Normal CP, the receiving side does not receive the PRS on the subframe which transmits the CSI-RS.

Preferably, when the network side configures the subframe 0 as the Normal CP, the subframe for transmitting the PRS only transmitted in the MBSFN subframe configured by the network side is not configured to transmit the CSI-RS; or, when the network side configures the subframe 0 as the Normal CP, the subframe for transmitting the CSI-RS configured by the network side is not configured to transmit the PRS which is transmitted only in the MBSFN subframe.

When the CP of the received subframe 0 is the Normal CP, the receiving side does not receive the CSI-RS on the subframe which transmits the PRS only configured on the MBSFN subframe when receiving the channels or signals of the network side; or, when the CP of the received subframe 0 is the Normal CP, the receiving side does not receive the PRS which is only configured on the MBSFN subframe on the subframe which transmits the CSI-RS.

Preferably, when the CSI-RS and the PRS are transmitted on the same resource, the CSI-RS is discarded, and the PRS is only transmitted.

Preferably, when the CSI-RS and the PRS are transmitted on the same resource, the PRS will be discarded, and the CSI-RS will be only transmitted.

Preferably, the subframe for transmitting the PRS configured by the network side is not configured to transmit the PDSCH. The receiving side does not receive the PDSCH on the subframe which transmits the PRS when receiving the channels or signals of the network side.

Preferably, when the network side configures the subframe 0 as the Normal CP, the subframe for transmitting the PRS is not configured to transmit the PDSCH. When the network side configures the subframe 0 as the Normal CP, the receiving side does not receive the PDSCH on the subframe which transmits the PRS when receiving the channels or signals of the network side.

Preferably, when the network side configures the PRS only transmitted on the MBSFN subframe, the subframe for transmitting the PRS is not configured to transmit the PDSCH. When the network side configures the PRS only transmitted on the MBSFN subframe, the receiving side does not receive the PDSCH on the subframe which transmits the PRS when receiving the channels or signals of the network side.

Preferably, when the CP of the subframe 0 is configured as a Normal CP and the PRS is configured to transmit only on the MBSFN subframe by the network side, the subframe for transmitting the PRS is not configured to transmit the PDSCH. When the CP of the subframe 0 is configured to the Normal CP and the PRS is configured to transmit only on the MBSFN subframe by the network side, the receiving side does not receive the PDSCH on the subframe which transmits the PRS when receiving the channels or signals of the network side.

Preferably, when the CP of the subframe 0 is configured as a Normal CP and the PRS is configured to transmit only on the MBSFN subframe, an OFDM symbol for transmitting the PDSCH in the MBSFN subframe which transmits the PRS adopts Extended CP.

Preferably, when the CP of the subframe 0 is configured as a Normal CP and the PRS is configured to transmit only on the MBSFN subframe, an OFDM symbol for transmitting the PDSCH in the MBSFN subframe which transmits the PRS adopts Normal CP.

Preferably, when the PDSCH and the PRS are transmitted on the same resource element, the resource element of the PDSCH on the position reference part will be discarded, and the PRS will be only transmitted.

Preferably, when the PDSCH and the PRS are transmitted on the same resource element, the PRS will be discarded, and the resource element of the PDSCH will be only transmitted.

Preferably, a subframe for transmitting the PRS configured by the network side is not configured to transmit the Relay backhaul link. The receiving side does not receive the Relay backhaul link on the subframe which transmits the PRS when receiving the channels or signals of the network side.

Preferably, when the CP of the subframe 0 configured by the network side is the Normal CP, the subframe for transmitting the PRS is not configured to transmit the Relay backhaul link. When the CP of the subframe 0 configured by the network side is the Normal CP, the receiving side does not receive the Relay backhaul link on the subframe which transmits the PRS when receiving the channels or signals of the network side.

Preferably, when the network side configures the PRS which is only transmitted on the MBSFN subframe, the subframe for transmitting the PRS is not configured to transmit the Relay backhaul link. When the network side configures the PRS which is only transmitted on the MBSFN subframe, the receiving side does not receive the Relay backhaul link on the subframe which transmits the PRS when receiving the channels or signals of the network side.

Preferably, when the network side configures the subframe 0 as the Normal CP and configures the PRS which is only transmitted on the MBSFN subframe, the subframe for transmitting the PRS is not configured to transmit the Relay backhaul link.

When the network side configures the subframe 0 as the Normal CP and configures the PRS which is only transmitted on the MBSFN subframe, the receiving side does not receive the Relay backhaul link on the subframe which transmits the PRS.

Preferably, when the Relay backhaul link and the PRS are transmitted on the same resource element, the resource element of the Relay backhaul link on the position reference part will be discarded, and the PRS will be only transmitted.

Preferably, when the Relay backhaul link and the PRS are transmitted on the same resource element, the PRS will be discarded, and the CSI-RS will be only transmitted.

Based on the method for transmitting a PRS provided by the disclosure, the disclosure also provides a corresponding implementation system, including a network side and a receiving side; wherein the network side configures at least one of the CSI-RS, the transmission PDSCH and the Relay backhaul link according to the configuration condition of the PRS, or the network side configures the PRS according to the configuration condition of at least one of the CSI-RS, the transmission PDSCH and the Relay backhaul link; and the receiving side identifies the length of CP, measures and receives signals transmitted by the network side according to the configuration information of the PRS which is issued by the network side and the configuration information of at least one of the corresponding CSI-RS, the transmission PDSCH and the Relay backhaul link.

Based on the method for transmitting a PRS provided by the disclosure, the disclosure also provides another corresponding implementation system, including a network side and a receiving side, wherein the network side semi-statically configures the period and subframe bias of the PRS, notifies the relative configuration of the PRS to the receiving side via the broadcast channel, the network side configures the OFDM CP of all the PRS subframes according to the CP configuration type of the subframe 0.

The network side may include a Macro eNodeB, or a Pico cell, or a Home eNodeB, or a Relay or the like. The receiving side includes a Relay, or a mobile terminal, or a user equipment or the like.

In the disclosure, the network side configures certain channels or signals according to the configuration condition of the PRS, or the network side configures the PRS according to the configuration condition of the certain channels or the signals; the receiving side correctly identifies the CP length according to the configuration information issued by the network side, so as to correctly measure and accurately receive the channels or signals transmitted by the network side. The disclosure overcomes the technical problem in the conventional art that the CP length is ambiguous, so that the signals cannot be measured and accurately received by the receiving side.

BRIEF DESCRIPTION OF THE DRAWINGS

FIG. 1 shows a flowchart of a method for transmitting a PRS in the disclosure.

DETAILED DESCRIPTION OF THE EMBODIMENTS

In order to make the purposes, technical solutions and advantages of the disclosure clearer, the disclosure is further described below with reference to the embodiments and drawings in details.

FIG.1 shows a flowchart of a method for transmitting a PRS in the disclosure; the method includes the following steps.

Step 101, the network side configures at least one of the CSI-RS, the PDSCH and the Relay backhaul link according to the configuration condition of the PRS;

or the network side configures the PRS according to the configuration condition of at least one of CSI-RS, PDSCH and Relay backhaul link.

Step 102, the network side notifies the configuration information of PRS and the configuration information of at least one of the corresponding CSI-RS, PDSCH and Relay backhaul link to the receiving side.

Step 103, the receiving side identifies the length of CP according to the configuration information of PRS and the configuration information of at least one of the corresponding CSI-RS, PDSCH and Relay backhaul link, so as to correctly measure and accurately receive the signals.

Embodiment 1:

The network side semi-statically configures the period and subframe bias of the PRS, and notifies the relative configuration of the PRS to the receiving side via the broadcast channel; in addition, the subframe configured to transmit the PRS by the network side is not configured to transmit certain channels or signals, and at this time the receiving side receiving the certain channels or signals is not also on the PRS subframe. The receiving side does not receive the certain channels or signals transmission on the subframe which transmits the PRS when receiving the PRS configuration or the PRS subframe. The certain channels or signals at least include one of the following: the PDSCH, the CSI-RS and the Relay backhaul link. The certain type of subframe at least includes one of: the PDSCH subframe, the CSI-RS subframe and the subframe configured as Relay backhaul link.

Embodiment 2:

The network side semi-statically configures the period and subframe bias of the PRS, and notifies the relative configuration of the PRS to the receiving side via the broadcast channel; when the network side configures the PRS which is transmitted only on the MBSFN subframe, the PRS subframe is not configured to transmit some channels or signals, or the PRS subframe is configured to only transmit the PRS and cannot be configured as the certain types of subframe. At this time, the receiving side does not receive certain channels or signals on the PRS subframe. The receiving side does not receive any of the certain channels or signal transmission on the PRS subframe when receiving the PRS configuration or the PRS subframe. When the PRS subframe and the certain type of subframe are transmitted in the same subframe, if part of or all the resource elements occupy the same resource elements, the resource elements of the certain type of channels or signals, or the resource element of the PRS can be discarded at this time. The certain channels or signals at least include one of the following: the PDSCH, the CSI-RS and the Relay backhaul link. The certain type of subframe at least includes one of: the PDSCH subframe, the CSI-RS subframe and the subframe configured as Relay backhaul link.

Embodiment 3:

The network side semi-statically configures the period and subframe bias of the PRS, and notifies the relative configuration of the PRS to the receiving side via the broadcast channel; when the network side configures the CP of the subframe 0 as the Normal CP, the PRS subframe is not configured to transmit certain channels or signals, or this PRS subframe is configured to only transmit the PRS and cannot be configured as the certain type of subframe. At this time, the receiving side does not expect to receive certain channels or signals on the PRS subframe. The receiving side does not receive any of the certain channels or signal transmission on the PRS subframe when receiving the PRS configuration or the PRS subframe. When the PRS subframe and the certain type of subframe are transmitted in the same subframe, if part of or all the resource elements occupy the same resource elements, the resource elements of the certain type of channels or signals, or the resource element of the PRS can be discarded at this time. The certain channels or signals at least include one of the following: the PDSCH, the CSI-RS and the Relay backhaul link. The certain type of subframe at least includes one of: the PDSCH subframe, the CSI-RS subframe and the MBSFN subframe configured as Relay backhaul link.

Embodiment 4:

The network side semi-statically configures the period and the subframe bias of the PRS, and notifies the relative configuration of the PRS to the receiving side via the broadcast channel; when the network side configures the CP of the subframe 0 as the Normal CP and configures the PRS to be transmitted only on the MBSFN subframe, the PRS subframe is not configured to transmit certain channels or signals, or this PRS subframe is only configured to transmit the PRS and cannot be configured as the certain type of subframe. At this time, the receiving side does not expect to receive certain channels or signals on the PRS subframe. The receiving side does not receive any of the certain channels or signal transmission on the PRS subframe when receiving the PRS configuration or the PRS subframe. When the PRS subframe and the certain type of subframe are transmitted in the same subframe, if part of or all the resource elements occupy the same resource elements, the resource elements of the certain type of channels or signals, or the resource element of the PRS can be discarded at this time. The certain channels or signals at least include one of the following: the PDSCH, the CSI-RS and the Relay backhaul link. The certain type of subframe at least includes one of: the PDSCH subframe, the CSI-RS subframe and the MBSFN subframe configured as the Relay backhaul link.

Embodiment 5

The network side semi-statically configures the period and subframe bias of the PRS, and notifies the relative configuration of the PRS to the receiving side via the high-level signaling; when the network side configures the CP of the subframe 0 as the Normal CP and configures the PSR to be transmitted only on the MBSFN subframe, the PRS subframe is not configured to transmit the PDSCH. The receiving side does not expect to receive the PDSCH on the PRS subframe, namely, the receiving side does not detect the possible PDCCH on this PRS subframe to determine whether the subframe has downlink data.

Embodiment 6:

The network side semi-statically configures the period and subframe bias of the PRS, and notifies the relative configuration of the PRS to the receiving side via the broadcast channel; in addition, the network side does not expect to schedule the PDSCH on the PRS subframe, receiving side does not receive the PDSCH on the PRS at this time. The receiving side does not receive the PDSCH transmission on the PRS subframe when receiving the PRS configuration or the PRS subframe. If the receiving side semi-statically configures or dynamically configures to receive the PDSCH on the PRS subframe, the receiving side does not perform the operation of receiving the PDSCH, or the receiving side discards the received PDSCH.

Embodiment 7:

The network side semi-statically configures the period and subframe bias of the PRS, and notifies the relative configuration of the PRS to the receiving side via the broadcast channel; in addition, the network side does not expect to schedule the PDSCH on the subframe which only configures the MBSFN subframe as the PRS subframe, and the receiving side does not receive the PDSCH on the subframe at this time. The receiving side does not receive the PDSCH on the PRS subframe when receiving the PRS configuration or the PRS subframe. If the receiving side semi-statically configures or dynamically configures to receive the PDSCH on this subframe, the receiving side does not perform the operation of receiving the PDSCH, or the receiving side discards the received PDSCH. When the network side only configures the Normal subframe as the PRS subframe, or only configures the Normal subframe and the MBSFN as the PRS subframe, the network side allows to schedule the PDSCH on this subframe; if the receiving side semi-statically configures or dynamically configures to receive the PDSCH on this subframe, the receiving side performs the operation of receiving the PDSCH and completes the subsequent corresponding flows. When the PRS subframe and the PDSCH subframe are transmitted in the same subframe, if part of or all the resource elements occupy the same resource element, the resource element of the PDSCH or the resource element of the PRS cannot be discarded at this time.

Embodiment 8:

The network side semi-statically configures the period and subframe bias of the PRS, and notifies the relative configuration of the PRS to the receiving side via the broadcast channel; in addition, the network side does not expect to schedule the PDSCH on the subframe which only configures the MBSFN subframe as the PRS subframe, and the receiving side does not receive the PDSCH on the subframe at this time. The receiving side does not receive the PDSCH on the PRS subframe when receiving the PRS configuration or the PRS subframe. If the receiving side semi-statically configures or dynamically configures to receive the PDSCH on this subframe, the receiving side does not perform the operation of receiving the PDSCH, or the receiving side discards the received PDSCH. When the network side only configures the Normal subframe as the PRS subframe, or only configures the Normal subframe and the MBSFN as the PRS subframe, the network side allows to schedule the PDSCH on this subframe; if the receiving side semi-statically configures or dynamically configures to receive the PDSCH on this subframe, the receiving side performs the operation of receiving the PDSCH and completes the subsequent corresponding flows. When the PRS subframe and the PDSCH subframe are transmitted in the same subframe, if part of or all the resource elements occupy the same resource element, the resource element of the PDSCH or the resource element of the PRS cannot be discarded at this time.

Embodiment 9:

The network side semi-statically configures the period and the subframe bias of the PRS, and notifies the relative configuration of the PRS to the receiving side via the broadcast channel; the network side configures not to restrict that the PDSCH subframe and the PRS subframe have no overlapping subframe; if the PDSCH subframe and the PRS subframe which are configured to the receiving side by the network side have the overlapping subframe configuration, the OFDM symbol CP length of the PDSCH transmitted by the network side is based on the OFDM CP length of the PRS in the overlapping subframe.

Namely, when the CP of the subframe 0 is the Normal CP, the network side configures the Normal subframe, or the Normal subframe and the MBSFN subframe to be the PRS subframe; and at this time, the CP of the OFDM symbol in the PRS subframe is configured as the Normal CP, and the CP of the OFDM symbol of the PDSCH in the overlapping subframe is also configured as the Normal CP.

When the CP of the subframe 0 is configured as the Extended CP, the network side configures the Normal subframe, or the Normal subframe and the MBSFN subframe to be the PRS subframe; and at this time, the CP of the OFDM symbol in the PRS subframe is configured as the Extended CP, and the CP of the OFDM symbol of the PDSCH in the overlapping subframe is also configured as the Extended CR.

When the CP of the subframe 0 is configured as the Normal CP, the network side only configures the MBSFN subframe to be the PRS frame, and at this time, the CP of the OFDM symbol in the PRS subframe is configured as the Extended CP, and the CP of the OFDM symbol of the PDSCH in the overlapping subframe is also configured as the Extended CP.

When the CP of the subframe 0 is the Extended CP, the network side only configures the MBSFN subframe as the PRS subframe, and at this time, the CP of the OFDM symbol in the PRS subframe is configured as the Extended CP, and the CP of the OFDM symbol of the PDSCH in the overlapping subframe is also configured as the Extended CP.

When the PRS subframe and the PDSCH subframe are transmitted in the same subframe, if part of or all the resource elements occupy the same resource element, the resource element of the PDSCH or the resource element of the PRS can be discarded at this time.

The receiving side receives the PDSCH and PRS according to the above standards to implement corresponding demodulation, decoding and positioning measurement.

Embodiment 10:

The network side semi-statically configures the period and subframe bias of the PRS, and notifies the relative configuration of PRS to the receiving side via the broadcast channel; when the network side only configures to transmit the PRS on the MBSFN subframe, and the network side configures the PDSCH transmission in the PRS MBSFN subframe; the OFDM symbol of the PDSCH in the PRS MBSFN subframe adopts the Extended CP.

When the CP of the subframe 0 is configured as the Normal CP, the network side only configures the MBSFN subframe to be the PRS frame, and at this time, the CP of the OFDM symbol in the PRS subframe is configured as the Extended CP, and the CP of the OFDM symbol of the PDSCH in the overlapping subframe is also configured as the Extended CP.

When the CP of the subframe 0 is the Extended CP, the network side only configures the MBSFN subframe as the PRS subframe, and at this time, the CP of the OFDM symbol in the PRS subframe is configured as the Extended CP, and the CP of the OFDM symbol of the PDSCH in the overlapping subframe is also configured as the Extended CP.

When the PRS subframe and the PDSCH subframe are transmitted in the same subframe, if part of or all the resource elements occupy the same resource element, the resource element of the PDSCH or the resource element of the PRS can be discarded at this time.

The receiving side receives the PDSCH and PRS according to the above standards to implement corresponding demodulation, decoding and positioning measurement. The above-mentioned overlapping subframe refers to the subframe which not only transmits the PDSCH subframe, but also transmits the PRS.

Embodiment 11:

The network side semi-statically configures the period and subframe bias of the PRS, and notifies the relative configuration of the PRS to the receiving side via the broadcast channel; the network side configures the OFDM CPs of all the PRS subframes according to the CP configuration type of the subframe 0.

Namely, when the CP of the subframe 0 is the Normal CP, the network side configures the Normal subframe, or the Normal subframe and the MBSFN subframe to be the PRS subframe; and at this time, the CP of the OFDM symbol in the PRS subframe is configured as the Normal CP, and the CP of the OFDM symbol of the PDSCH in the overlapping subframe is also configured as the Normal CP.

When the CP of the subframe 0 is configured as the Extended CP, the network side configures the Normal subframe, or the Normal subframe and the MBSFN subframe to be the PRS subframe; and at this time, the CP of the OFDM symbol in the PRS subframe is configured as the Extended CP, and the CP of the OFDM symbol of the PDSCH in the overlapping subframe is also configured as the Extended CP.

When the CP of the subframe 0 is configured as the Normal CP, the network side only configures the MBSFN subframe to be the PRS frame, and at this time, the CP of the OFDM symbol in the PRS subframe is configured as the Normal CP, and the CP of the OFDM symbol of the PDSCH in the overlapping subframe is also configured as the Normal CP.

When the CP of the subframe 0 is the Extended CP, the network side only configures the MBSFN subframe as the PRS subframe, and at this time, the CP of the OFDM symbol in the PRS subframe is configured as the Extended CP, and the CP of the OFDM symbol of the PDSCH in the overlapping subframe is also configured as the Extended CP.

When the PRS subframe and the PDSCH subframe are transmitted in the same subframe, if part of or all the resource elements occupy the same resource element, the resource element of the PDSCH or the resource element of the PRS can be discarded at this time.

The receiving side receives the PDSCH and PRS according to the above standards to implement corresponding demodulation, decoding and positioning measurement. The above-mentioned overlapping subframe refers to the subframe which not only transmits the PDSCH subframe, but also transmits the PRS.

Embodiment 12:

The network side semi-statically configures the period and subframe bias of the PRS, and notifies the relative configuration of the PRS to the receiving side via the broadcast channel; if the network side only configures the MBSFN subframe to be the PRS subframe, and the PDSCH is transmitted in the configured PRS subframe, the CP length of the PRS subframe is equal to the OFDM symbol CP length of the PDSCH, namely, the CP length of the PRS subframe is equal to the CP length of the subframe 0. If the network side only configures the MBSFN subframe to be the PRS subframe, and the configured PRS subframe is not configured to transmit the PDSCH, namely, the PRS subframe and the PDSCH transmission have no overlapping subframe, and then the PRS subframe is configured as the Extended CP at this time.

Namely, when the CP of the subframe 0 is the Normal CP, the network side configures the Normal subframe, or the Normal subframe and the MBSFN subframe to be the PRS subframe; and at the time, the OFDM symbols in all the PRS subframes are configured as the Normal CP, the OFDM symbol of the PDSCH is also configured as the Normal CP.

When the CP of the subframe 0 is configured as the Extended CP, the network side configures the Normal subframe, or the Normal subframe and the MBSFN subframe to be the PRS subframe; and at the time, the OFDM symbols in all the PRS subframes are configured as the Extended CP, the OFDM symbol of the PDSCH is also configured as the Extended CR.

When the CP of the subframe 0 is configured as the Normal CP, the network side only configures the MBSFN subframe to be the PRS frame, and at the time, the OFDM symbol in the non-overlapping PRS subframe is configured as the Extended CP, the OFDM symbol in the overlapping PRS subframe is configured as the Normal CP, and the OFDM symbol of the PDSCH is also configured as the Normal CP.

When the CP of the subframe 0 is the Extended CP, the network side only configures the MBSFN subframe as the PRS subframe, and at the time, the OFDM symbols in all the PRS subframes are configured as the Extended CP, the OFDM symbol of the PDSCH is also configured as the Extended CP.

When the PRS subframe and the PDSCH subframe are transmitted in the same subframe, if part of or all the resource elements occupy the same resource element, the resource element of the PDSCH or the resource element of the PRS can be discarded at this time.

The receiving side receives the PDSCH and PRS according to the above standards to implement corresponding demodulation, decoding and positioning measurement. The above-mentioned overlapping subframe refers to the subframe which not only transmits the PDSCH subframe, but also transmits the PRS.

In order to realize the above method embodiments, the other embodiments of the disclosure also provide a system for transmitting the PRS, including: a network side and a receiving side. As the system is set to implement the above-mentioned method, the modules of the network side and the receiving side are set to implement each step of the above-mentioned method; moreover, the functions of the modules and the interactions among the modules can be directly obtained or led out from the above-mentioned method embodiments, so they are not described here any more; however, any system or device which is able to realize the above-mentioned methods shall fall within the protection range of the disclosure.

INDUSTRIAL APPLICABILITY

The disclosure solves the technical problems that when the PDSCH, the CSI-RS, and the Relay backhaul link in Release 10 are being transmitted with the PRS, the CP length is ambiguous, such that the receiving side cannot measure and accurately receive signals; thereby, the receiving side can correctly measure and accurately receive the channels or signals transmitted by the network side.

What is claimed is:

1. A method for transmitting a Position Reference Signal (PRS), comprising:
    a network side configuring at least one of a Channel State Information Reference Signal (CSI-RS), a transmission Physical Downlink Shared Channel (PDSCH) and a Relay backhaul link according to the configuration condition of a PRS, or the network side configuring the PRS according to the configuration condition of at least one of the CSI-RS, the transmission PDSCH and the Relay backhaul link; and
    the network side transmitting to a receiving side the configuration information of the PRS and the configuration information of at least one of the corresponding CSI-RS, the transmission PDSCH and the Relay backhaul link;
    wherein the method further comprises: when a CP of the subframe 0 is configured as a Normal CP and the PRS is configured to transmit only on the MBSFN subframe by the network side, the subframe for transmitting the PRS is not configured to transmit the PDSCH; wherein when the CP of the subframe 0 is configured as a Normal CP and the PRS is configured to transmit only on the MBSFN subframe by the network side, the receiving side does not expect to receive the PDSCH on the subframe which transmits the PRS when receiving the channels or signals of the network side;
    wherein the network side semi-statically configures the period and subframe bias of the PRS, and notifies the relative configuration of the PRS to the receiving side via the broadcast channel, and then the network side configures the OFDM CPs of all the PRS subframes according to the CP configuration type of the subframe 0.

2. The method according to claim 1, further comprising:
    wherein a subframe configured to transmit the PRS by the network side is not configured to transmit the CSI-RS; or a subframe configured to transmit the CSI-RS by the network side is not configured to transmit the PRS;
    or wherein a subframe configured to transmit the PRS only in a Multiple Broadcast Single Frequency Network (MBSFN) subframe by the network side is not configured to transmit the CSI-RS; or a subframe configured to transmit the CSI-RS by the network side is not configured to transmit the PRS which is transmitted only in the MBSFN subframe;
    or wherein when the CP of the subframe 0 is configured as a Normal CP by the network side, the subframe configured to transmit the PRS by the network side is not configured to transmit the CSI-RS; or when the CP of the subframe 0 is configured as the Normal CP by the network side, the subframe configured to transmit the CSI-RS by the network side is not configured to transmit the PRS;
    or wherein when the CP of the subframe 0 is configured as a Normal CP by the network side, the subframe configured to transmit the PRS only in the MBSFN subframe by the network side is not configured to transmit the CSI-RS; or when the CP of the subframe 0 is configured as the Normal CP by the network side, the subframe configured to transmit the CSI-RS by the network side is not configured to transmit the PRS which is transmitted only in the MBSFN subframe.

3. The method according to claim 1, wherein when the CSI-RS and the PRS are transmitted on the same resource, discarding the CSI-RS, and only transmitting the PRS; or when the CSI-RS and the PRS are transmitted on the same resource, discarding the PRS, and only transmitting the CSI-RS; or when the PDSCH and the PRS are transmitted on the same resource element, discarding the resource element of the PDSCH on the position reference part, and only transmitting the PRS; or when the PDSCH and the PRS are transmitted on the same resource element, discarding the PRS, and only transmitting the resource element of the PDSCH; or when the Relay backhaul link and the PRS are transmitted on the same resource element, discarding the resource element of the Relay backhaul link on the position reference part, and only transmitting the PRS; or when the Relay backhaul link and the PRS are transmitted on the same resource element, discarding the PRS, and only transmitting the CSI-RS.

4. The method according to claim 1, further comprising:
    wherein a subframe configured to transmit the PRS by the network side is not configured to transmit the PDSCH;
    or wherein the CP of the subframe 0 is configured as a Normal CP by the network side, the subframe for transmitting the PRS is not configured to transmit the PDSCH;
    or wherein when the PRS is configured to transmit only on the MBSFN subframe by the network side, the subframe for transmitting the PRS is not configured to transmit the PDSCH;
    or wherein a subframe configured to transmit the PRS by the network side is not configured to transmit the Relay backhaul link;
    or wherein when the CP of the subframe 0 is configured as the Normal CP by the network side, the subframe for transmitting the PRS is not configured to transmit the Relay backhaul link;
    or wherein when the PRS is configured to transmit only on the MBSFN subframe by the network side, the subframe for transmitting the PRS is not configured to transmit the Relay backhaul link;
    or wherein when the CP of the subframe 0 is configured as a Normal CP and the PRS is configured to transmit only on the MBSFN subframe by the network side, the subframe for transmitting the PRS is not configured to transmit the Relay backhaul link.

5. The method according to claim 1, wherein when the CP of the subframe 0 is configured, by the network side, as a Normal CP and the PRS is configured, by the network side, to transmit only on the MBSFN subframe, an Orthogonal Frequency Division Multiplexing (OFDM), the PRS subframe and the PDSCH subframe are transmitted in the same symbol for transmitting the PDSCH in the MBSFN subframe which transmits the PRS adopts Extended CP; or when the CP of the subframe 0 is configured as a Normal CP and the PRS is configured to transmit only on the MBSFN subframe by the network side, an OFDM symbol for transmitting the PDSCH in the MBSFN subframe which transmits the PRS adopts Normal CP.

6. A method for transmitting a PRS, comprising:
a receiving side identifying a length of Cyclic Prefix (CP), measuring and receiving signals transmitted by a network side according to the configuration information of a PRS which is issued by the network side and the configuration information of at least one of the corresponding Channel State Information Reference Signal (CSI-RS), the corresponding transmission Physical Downlink Shared Channel (PDSCH) and the corresponding Relay backhaul link;
wherein the PRS is configured by the network side according to the configuration condition of at least one of a CSI-RS, a transmission PDSCH and a Relay backhaul link, or at least one of the CSI-RS, the transmission PDSCH and the Relay backhaul link is configured by the network side according to the configuration condition of the PRS;
wherein the method further comprises: when a CP of the subframe 0 is configured as a Normal CP and the PRS is configured to transmit only on the MBSFN subframe by the network side, the subframe for transmitting the PRS is not configured to transmit the PDSCH; wherein when the CP of the subframe 0 is configured as a Normal CP and the PRS is configured to transmit only on the MBSFN subframe by the network side, the receiving side does not expect to receive the PDSCH on the subframe which transmits the PRS when receiving the channels or signals of the network side;
wherein the method further comprises: the receiving side receives the relative configuration of the PRS, which is obtained by configuring, by the network side, the period and subframe bias of the PRS, via the broadcast channel.

7. The method according to claim 6, further comprising:
wherein the receiving side receiving the CSI-RS is not on the subframe which transmits the PRS when receiving the channels or signals of the network side; or the receiving side receiving the PRS is not on the subframe which transmits the CSI-RS when receiving the channels or signals of the network side;
or wherein the receiving side receiving the CSI-RS is not on the subframe which transmits the PRS only configured on the MBSFN subframe when receiving the channels or signals of the network side; or the receiving side receiving the PRS which is only configured on the MBSFN subframe is not on the subframe which transmits the CSI-RS when receiving the channels or signals of the network side;
or wherein when the CP of the received subframe 0 is the Normal CP, the receiving side receiving the CSI-RS is not on the subframe which transmits the CSI-RS when receiving the channels or signals of the network side; or when the CP of the received subframe 0 is the Normal CP, the receiving side receiving the PRS is not on the subframe which transmits the CSI-RS;
or wherein when the CP of the received subframe 0 is the Normal CP, the receiving side receiving the CSI-RS is not on the subframe which transmits the PRS only configured on the MBSFN subframe when receiving the channels or signals of the network side; or when the CP of the received subframe 0 is the Normal CP, the receiving side receiving the PRS which is only configured on the MBSFN subframe is not on the subframe which transmits the CSI-RS.

8. The method according to claim 6, further comprising:
wherein the receiving side receiving the PDSCH is not on the subframe which transmits the PRS when receiving the channels or signals of the network side;
or wherein the CP of the subframe 0 is configured as the Normal CP by the network side, the receiving side receiving the PDSCH is not on the subframe which transmits the PRS when receiving the channels or signals of the network side;
or wherein when the PRS is configured to transmit only on the MBSFN subframe by the network side, the receiving side receiving the PDSCH is not on the subframe which transmits the PRS when receiving the channels or signals of the network side;
or wherein when the CP of the subframe 0 is configured as a Normal CP and the PRS is configured to transmit only on the MBSFN subframe by the network side, the receiving side does not expect to receive the PDSCH on the subframe which transmits the PRS when receiving the channels or signals of the network side;
or wherein the receiving side receiving the Relay backhaul link is not on the subframe which transmits the PRS when receiving the channels or signals of the network side;
or wherein when the CP of the subframe 0 is configured as the Normal CP by the network side, the receiving side receiving the Relay backhaul link is not on the subframe which transmits the PRS when receiving the channels or signals of the network side;
or wherein when the PRS is configured to transmit only on the MBSFN subframe by the network side, the receiving side receiving the Relay backhaul link is not on the subframe which transmits the PRS when receiving the channels or signals of the network side;
or wherein when the CP of the subframe 0 is configured as a Normal CP and the PRS is configured to transmit only on the MBSFN subframe by the network side, the receiving side does not expect to receive the Relay backhaul link on the subframe which transmits the PRS.

9. The method according to claim 6, wherein when the CP of the subframe 0 is configured, by the network side, as a Normal CP and the PRS is configured, by the network side, to transmit only on the MBSFN subframe, an Orthogonal Frequency Division Multiplexing (OFDM), the PRS subframe and the PDSCH subframe are transmitted in the same symbol for transmitting the PDSCH in the MBSFN subframe which transmits the PRS adopts Extended CP; or when the CP of the subframe 0 is configured as a Normal CP and the PRS is configured to transmit only on the MBSFN subframe by the network side, an OFDM symbol for transmitting the PDSCH in the MBSFN subframe which transmits the PRS adopts Normal CP.

10. A network side element for transmitting a PRS, comprising:

the network side element configuring at least one of a Channel State Information Reference Signal (CSI-RS), a transmission Physical Downlink Shared Channel (PDSCH) and a Relay backhaul link according to the configuration condition of a PRS, or the network side element configuring the PRS according to the configuration condition of at least one of the CSI-RS, the transmission PDSCH and the Relay backhaul link; and the network side element transmitting to a receiving side the configuration information of the PRS and the configuration information of at least one of the corresponding CSI-RS, the transmission PDSCH and the Relay backhaul link;

wherein when a CP of the subframe 0 is configured as a Normal CP and the PRS is configured to transmit only on the MBSFN subframe by the network side, the subframe for transmitting the PRS is not configured to transmit the PDSCH; wherein when the CP of the subframe 0 is configured as a Normal CP and the PRS is configured to transmit only on the MBSFN subframe by the network side, the receiving side does not expect to receive the PDSCH on the subframe which transmits the PRS when receiving the channels or signals of the network side;

wherein the network side element is further configured to semi-statically configure the period and subframe bias of the PRS, and notify the relative configuration of the PRS to the receiving side via the broadcast channel, and then configure the OFDM CPs of all the PRS subframes according to the CP configuration type of the subframe 0.

11. The network side element according to claim 10, further comprising:

wherein a subframe configured to transmit the PRS by the network side element is not configured to transmit the CSI-RS; or a subframe configured to transmit the CSI-RS by the network side element is not configured to transmit the PRS;

or wherein a subframe configured to transmit the PRS only in a Multiple Broadcast Single Frequency Network (MBSFN) subframe by the network side element is not configured to transmit the CSI-RS; or a subframe configured to transmit the CSI-RS by the network side element is not configured to transmit the PRS which is transmitted only in the MBSFN subframe;

or wherein when the CP of the subframe 0 is configured as a Normal CP by the network side element, the subframe configured to transmit the PRS by the network side element is not configured to transmit the CSI-RS; or when the CP of the subframe 0 is configured as the Normal CP by the network side element, the subframe configured to transmit the CSI-RS by the network side element is not configured to transmit the PRS;

or wherein when the CP of the subframe 0 is configured as a Normal CP by the network side element, the subframe configured to transmit the PRS only in the MBSFN subframe by the network side element is not configured to transmit the CSI-RS; or when the CP of the subframe 0 is configured as the Normal CP by the network side element, the subframe configured to transmit the CSI-RS by the network side element is not configured to transmit the PRS which is transmitted only in the MBSFN subframe.

12. The network side element according to claim 10, wherein when the CSI-RS and the PRS are transmitted on the same resource, discarding the CSI-RS, and only transmitting the PRS; or when the CSI-RS and the PRS are transmitted on the same resource, discarding the PRS, and only transmitting the CSI-RS; or when the PDSCH and the PRS are transmitted on the same resource element, discarding the resource element of the PDSCH on the position reference part, and only transmitting the PRS; or when the PDSCH and the PRS are transmitted on the same resource element, discarding the PRS, and only transmitting the resource element of the PDSCH; or when the Relay backhaul link and the PRS are transmitted on the same resource element, discarding the resource element of the Relay backhaul link on the position reference part, and only transmitting the PRS; or when the Relay backhaul link and the PRS are transmitted on the same resource element, discarding the PRS, and only transmitting the CSI-RS.

13. The network side element according to claim 10, further comprising:

wherein a subframe configured to transmit the PRS by the network side element is not configured to transmit the PDSCH;

or wherein the CP of the subframe 0 is configured as a Normal CP by the network side element, the subframe for transmitting the PRS is not configured to transmit the PDSCH;

or wherein when the PRS is configured to transmit only on the MBSFN subframe by the network side element, the subframe for transmitting the PRS is not configured to transmit the PDSCH;

or wherein when the CP of the subframe 0 is configured as a Normal CP and the PRS is configured to transmit only on the MBSFN subframe by the network side element, the subframe for transmitting the PRS is not configured to transmit the PDSCH;

or wherein a subframe configured to transmit the PRS by the network side element is not configured to transmit the Relay backhaul link;

or wherein when the CP of the subframe 0 is configured as the Normal CP by the network side element, the subframe for transmitting the PRS is not configured to transmit the Relay backhaul link;

or wherein when the PRS is configured to transmit only on the MBSFN subframe by the network side element, the subframe for transmitting the PRS is not configured to transmit the Relay backhaul link;

or wherein when the CP of the subframe 0 is configured as a Normal CP and the PRS is configured to transmit only on the MBSFN subframe by the network side element, the subframe for transmitting the PRS is not configured to transmit the Relay backhaul link.

14. The network side element according to claim 10, wherein when the CP of the subframe 0 is configured, by the network side, as a Normal CP and the PRS is configured, by the network side, to transmit only on the MBSFN subframe, an Orthogonal Frequency Division Multiplexing (OFDM), the PRS subframe and the PDSCH subframe are transmitted in the same symbol for transmitting the PDSCH in the MBSFN subframe which transmits the PRS adopts Extended CP; or when the CP of the subframe 0 is configured as a Normal CP and the PRS is configured to transmit only on the MBSFN subframe by the network side element, an OFDM symbol for transmitting the PDSCH in the MBSFN subframe which transmits the PRS adopts Normal CP.

15. A receiving side element for transmitting a PRS, comprising:

the receiving side element identifying a length of Cyclic Prefix (CP), measuring and receiving signals transmitted by a network side according to the configuration information of a PRS which is issued by the network side and the configuration information of at least one of the corresponding Channel State Information Reference Signal (CSI-RS), the corresponding transmission Physical Downlink Shared Channel (PDSCH) and the corresponding Relay backhaul link;

wherein the PRS is configured by the network side according to the configuration condition of at least one of a CSI-RS, a transmission PDSCH and a Relay backhaul link, or at least one of the CSI-RS, the transmission PDSCH and the Relay backhaul link is configured by the network side according to the configuration condition of the PRS;

wherein when a CP of the subframe 0 is configured as a Normal CP and the PRS is configured to transmit only on the MBSFN subframe by the network side, the subframe for transmitting the PRS is not configured to transmit the PDSCH; wherein when the CP of the subframe 0 is configured as a Normal CP and the PRS is configured to transmit only on the MBSFN subframe by the network side, the receiving side does not expect to receive the PDSCH on the subframe which transmits the PRS when receiving the channels or signals of the network side;

wherein the receiving side element is further configured to receive the relative configuration of the PRS, which is obtained by configuring, by the network side, the period and subframe bias of the PRS, via the broadcast channel.

16. The receiving side element according to claim 15, further comprising:

wherein the receiving side element receiving the CSI-RS is not on the subframe which transmits the PRS when receiving the channels or signals of the network side; or the receiving side element receiving the PRS is not on the subframe which transmits the CSI-RS when receiving the channels or signals of the network side;

or wherein the receiving side element receiving the CSI-RS is not on the subframe which transmits the PRS only configured on the MBSFN subframe when receiving the channels or signals of the network side; or the receiving side element receiving the PRS which is only configured on the MBSFN subframe is not on the subframe which transmits the CSI-RS when receiving the channels or signals of the network side;

or wherein when the CP of the received subframe 0 is the Normal CP, the receiving side element receiving the CSI-RS is not on the subframe which transmits the CSI-RS when receiving the channels or signals of the network side; or when the CP of the received subframe 0 is the Normal CP, the receiving side element receiving the PRS is not on the subframe which transmits the CSI-RS;

or wherein when the CP of the received subframe 0 is the Normal CP, the receiving side element receiving the CSI-RS is not on the subframe which transmits the PRS only configured on the MBSFN subframe when receiving the channels or signals of the network side; or when the CP of the received subframe 0 is the Normal CP, the receiving side element receiving the PRS which is only configured on the MBSFN subframe is not on the subframe which transmits the CSI-RS.

17. The receiving side element according to claim 15, further comprising:

wherein the receiving side element receiving the PDSCH is not on the subframe which transmits the PRS when receiving the channels or signals of the network side;

or wherein the CP of the subframe 0 is configured as the Normal CP by the network side, the receiving side element receiving the PDSCH is not on the subframe which transmits the PRS when receiving the channels or signals of the network side;

or wherein when the PRS is configured to transmit only on the MBSFN subframe by the network side, the receiving side element receiving the PDSCH is not on the subframe which transmits the PRS when receiving the channels or signals of the network side;

or wherein when the CP of the subframe 0 is configured as a Normal CP and the PRS is configured to transmit only on the MBSFN subframe by the network side, the receiving side element does not expect to receive the PDSCH on the subframe which transmits the PRS when receiving the channels or signals of the network side.

18. The receiving side element according to claim 15, further comprising:

wherein the receiving side element receiving the Relay backhaul link is not on the subframe which transmits the PRS when receiving the channels or signals of the network side;

or wherein when the CP of the subframe 0 is configured as the Normal CP by the network side, the receiving side element receiving the Relay backhaul link is not on the subframe which transmits the PRS when receiving the channels or signals of the network side;

or wherein when the PRS is configured to transmit only on the MBSFN subframe by the network side, the receiving side element receiving the Relay backhaul link is not on the subframe which transmits the PRS when receiving the channels or signals of the network side;

or wherein when the CP of the subframe 0 is configured as a Normal CP and the PRS is configured to transmit only on the MBSFN subframe by the network side, the receiving side element does not expect to receive the Relay backhaul link on the subframe which transmits the PRS.

19. The receiving side element according to claim 15, wherein when the CP of the subframe 0 is configured, by the network side, as a Normal CP and the PRS is configured, by the network side, to transmit only on the MBSFN subframe, an Orthogonal Frequency Division Multiplexing (OFDM) and the PRS subframe are transmitted in the same symbol for transmitting the PDSCH in the MBSFN subframe which transmits the PRS adopts Extended CP; or when the CP of the subframe 0 is configured as a Normal CP and the PRS is configured to transmit only on the MBSFN subframe by the network side element, an OFDM symbol for transmitting the PDSCH in the MBSFN subframe which transmits the PRS adopts Normal CP.

* * * * *